United States Patent [19]
Tuvy et al.

[11] Patent Number: 5,995,617
[45] Date of Patent: Nov. 30, 1999

[54] CONNECTOR BLOCK MOUNTABLE CONNECTOR AND TELEPHONE CIRCUIT

[75] Inventors: Avraham Tuvy, Oakhurst; Anthony L. Nieves, Shark River Hills, both of N.J.

[73] Assignee: Antec Corporation, Duluth, Ga.

[21] Appl. No.: 08/897,738

[22] Filed: Jul. 21, 1997

Related U.S. Application Data

[63] Continuation-in-part of application No. 08/647,062, May 9, 1996.

[51] Int. Cl.$^6$ .............................. H04M 3/00; H04M 1/00
[52] U.S. Cl. .......................... 379/332; 379/326; 379/327; 379/329; 379/330; 379/412; 379/428
[58] Field of Search .................................. 379/326, 327, 379/329, 330, 332, 412, 428

[56] References Cited

U.S. PATENT DOCUMENTS

| | | | |
|---|---|---|---|
| 4,585,290 | 4/1986 | Knickerbocker et al. | 339/97 R |
| 4,655,521 | 4/1987 | Thomas | 339/31 R |
| 4,924,345 | 5/1990 | Seimon et al. | 361/111 |
| 5,315,064 | 5/1994 | Andrews | 174/40 TD |
| 5,420,920 | 5/1995 | Capper et al. | 379/399 |

*Primary Examiner*—Fan S. Tsang
*Assistant Examiner*—Allan Hoosain

[57] ABSTRACT

Connector including a housing including a resilient portion provided with a cavity, connectors mounted in the cavity, the resilient portion deformable to increase access to the cavity to facilitate insertion and mounting of the connectors in the cavity, the connectors for mechanically and electrically engaging a first pair of terminals to which an incoming telephone line is connected and a second pair of terminals to which a telephone subscriber line is connected to mount the connector to the pairs of terminals and to electrically interconnect the incoming telephone line with the telephone subscriber line, a telephone circuit is provided in the connector which is connected to the connectors for connection to one of the lines or to both of the lines; alternate connector includes test terminal assemblies for the external testing of the incoming telephone company line and telephone subscriber line and a telephone circuit mounted internally of the connector without dismounting the connector from a connector block to which the incoming telephone company line and telephone subscriber line are connected.

13 Claims, 12 Drawing Sheets

CONNECTOR BLOCK MOUNTABLE CONNECTOR AND TELEPHONE CIRCUIT

RELATED PATENT APPLICATION

This application is a continuation-in-part application Ser. of pending patent application No. 08/647,062, entitled "Connector Block Mountable Connector & Telephone Circuit," filed May 9, 1996, in the names of Tuvy, et al. and assigned to the assignee of the present invention.

BACKGROUND OF THE INVENTION

This invention relates generally to a connector block mountable apparatus or connector and telephone circuit and more particularly relates to apparatus or connector for being mounted on the terminals of a connector block, such as the 66 connector block, and for interconnecting an incoming telephone company line with a telephone subscriber line and for providing and connecting a half-ringer in parallel with such lines.

Numerous apparatus or connectors are known to the art for being mounted to the terminals provided on a connector block, such as a 66 block, and which apparatus include various circuits such as attenuation circuits, maintenance terminating units (MTU's) and the like.

However, there appears to be a need in the art for apparatus or connector for being mounted to the terminals of a connector block, such as a 66 block, and which apparatus or connector interconnects an incoming telephone line with a telephone subscriber line and provides and interconnects a telephone circuit, such as a half-ringer, to such lines.

SUMMARY OF THE INVENTION

It is an object of the present invention to satisfy the foregoing need in the art.

Apparatus or connector satisfying such need and embodying the present invention may include housing means at least a portion of which is a resilient portion provided with cavity means, connecting means mounted in the cavity means, the resilient portion being deformable to increase access to the cavity means to facilitate insertion and mounting of the connecting means in the cavity means, the connecting means for mechanically and electrically engaging a first pair of terminals to which an incoming telephone line is connected and a second pair of terminals to which a telephone subscriber line is connected to mount the apparatus to the pairs of terminals and to electrically interconnect the incoming telephone line with the telephone subscriber line, a telephone circuit is provided in the apparatus and is connected to the connecting means for connection to one of the lines or to both of the lines; the telephone circuit may be, for example, a half-ringer connected in parallel with such lines. Alternate embodiment apparatus or connector includes test terminal assemblies for the external testing of the incoming telephone company line and telephone subscriber line and a telephone circuit mounted internally of the apparatus or connector without dismounting the apparatus or connector from a connector block to which the incoming telephone company line and telephone subscriber line are connected.

DESCRIPTION OF THE PREFERRED EMBODIMENT

Figure 1:
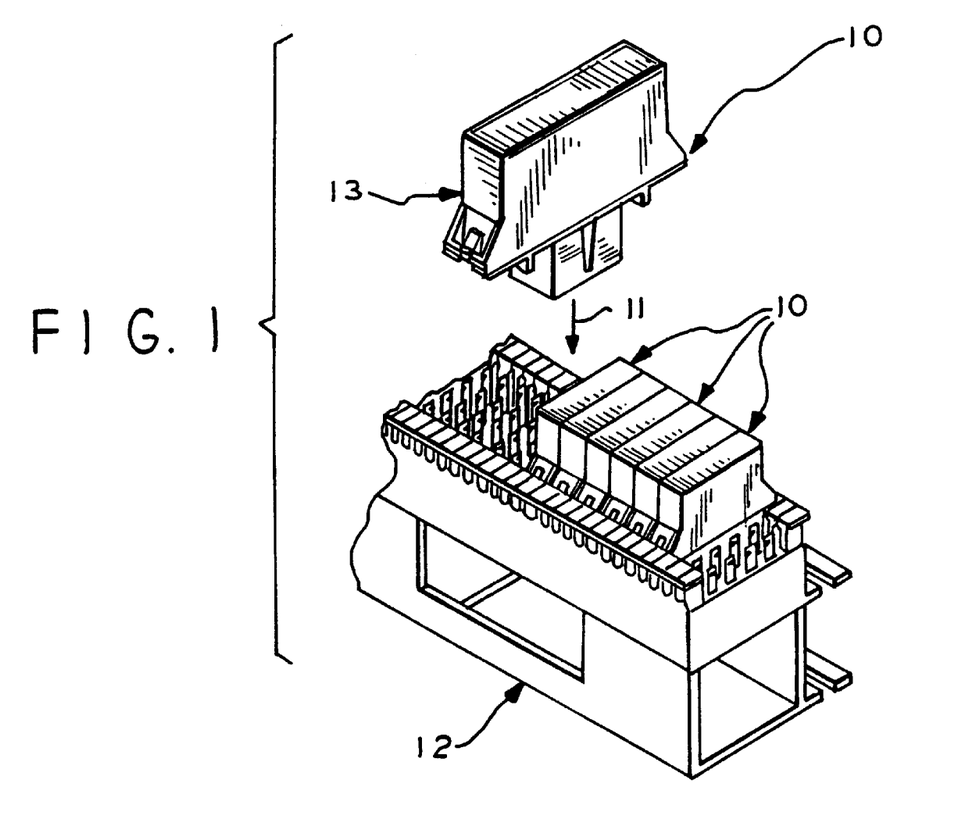
FIG. 1 is a fragmentary perspective view illustrating a plurality of the apparatus or connector of the present invention mounted, and one being mounted, to a connector block.

If Referring now to FIG. 1, a plurality of apparatus or connectors embodying the present invention are shown and indicated by general numerical reference 10; in FIG. 1, a plurality of such apparatus or connectors 10 are shown mounted to a connector block indicated by general numerical reference 12 and one apparatus or connector 10 is indicated by the arrow 11 as being in the process of being mounted to the connector block. The connector block 12 may be, for example, the 66 connector block known to the art for interconnecting a plurality of incoming telephone lines with a plurality of telephone subscriber or telephone customer lines.

Figure 2:
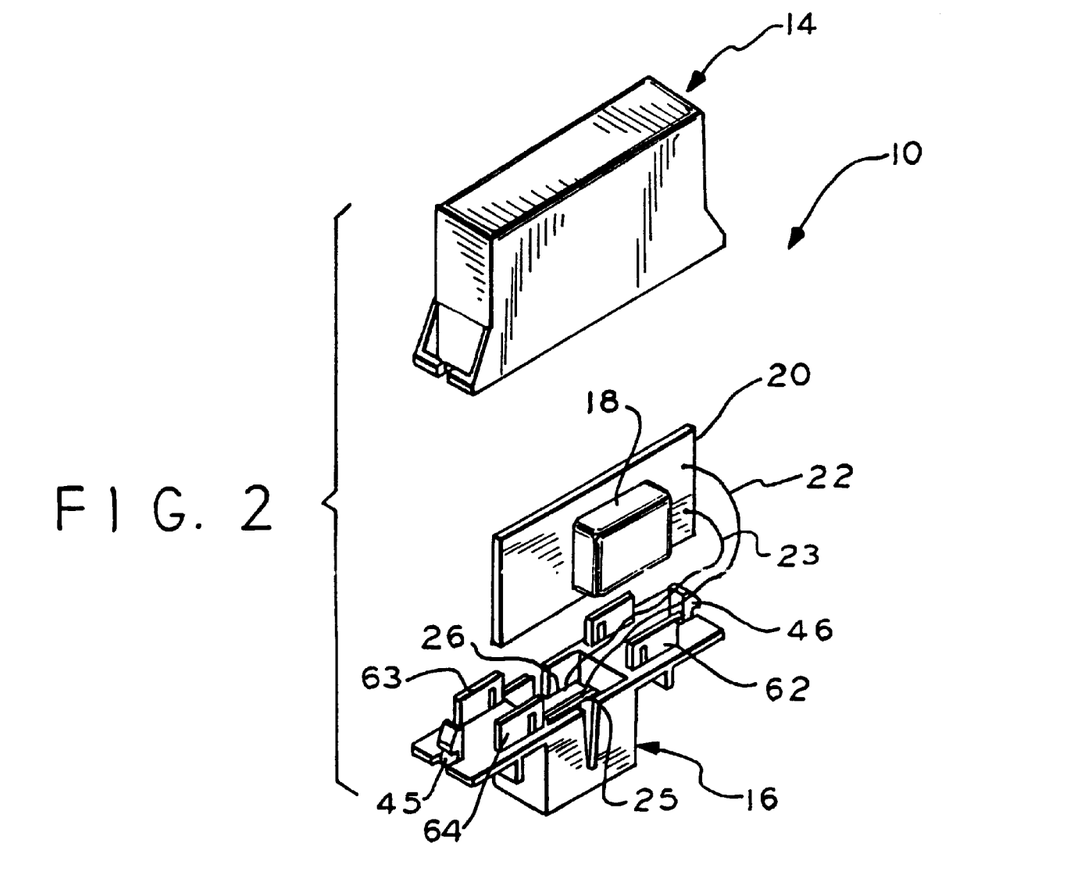
FIG. 2 is an exploded view of the apparatus or connector of the present invention.
Figure 3:
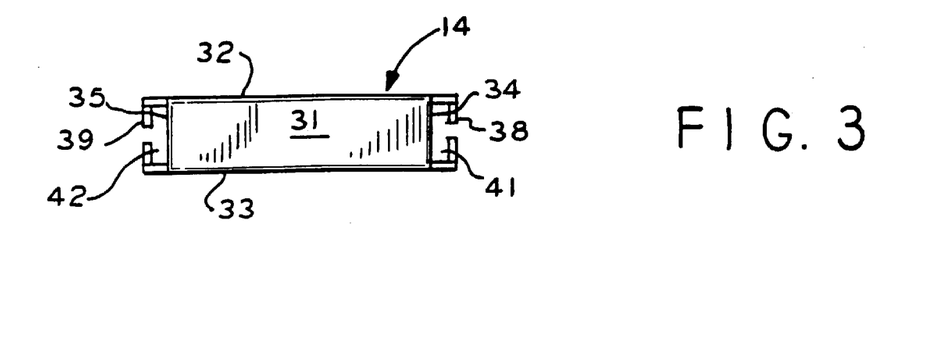
FIGS. 3–6 are, respectively, top, front, side and perspective views of the cover of the present invention.
Figure 4:
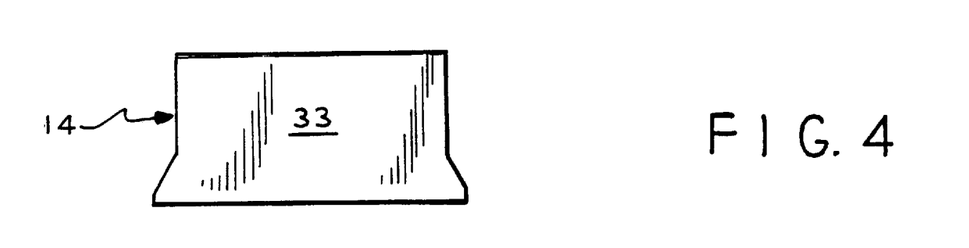
Figure 5:
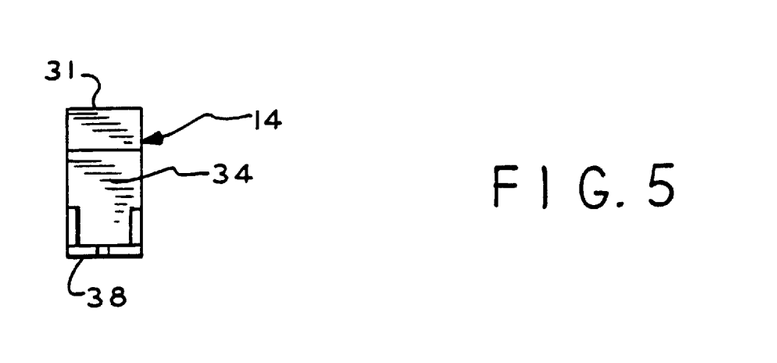
Figure 6:
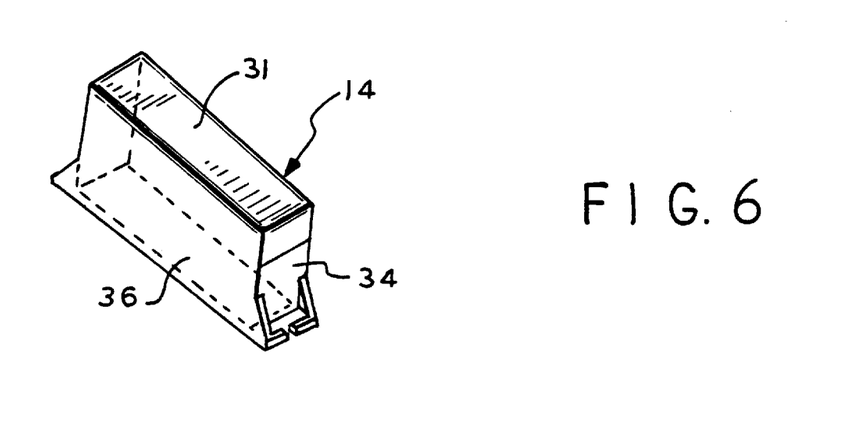

Apparatus or connector 10 includes a housing indicated by general numerical reference 13 in FIG. 1 and from the exploded view of apparatus or connector 10 shown in FIG. 2 it will be understood that housing 13 may include a cover 14 and a base 16. From FIG. 2, it will be understood that apparatus or connector 10 also includes a telephone circuit 18 which telephone circuit is sometimes referred to in the art as station electronics or telephone station electronics; in the preferred embodiment the telephone circuit is a half-ringer, but it will be understood that in the present invention the telephone circuit 18 may be other telephone circuits or station electronics known to the art such as, for example, a maintenance terminating unit or the like, and which telephone circuits are suitably interconnected to either an incoming telephone line, a telephone subscriber line, or to both, in the manner known to the art. The telephone circuit 18 is mounted suitably, in the manner known to the art, to a circuit board 20 which may have other electrical components suitably mounted thereon, in the manner known to the art, if needed to operate in conjunction with the telephone circuit 18 to perform an intended telephone circuit function. The printed circuit board 20, and thereby the telephone circuit 18, are connected (FIG. 2) by leads 22 and 23 to a pair of bridging clips 25 and 26, better seen in FIGS. 11 and 14, of the type known to the art; the leads 22 and 23 are connected to the telephone circuit 18 by suitable conductive traces (not shown) provided on the printed circuit board. Bridging clips 25 and 26 are electrically conductive and are sometimes referred to in the art as spring clips or spring bridging clips.

Figure 8:
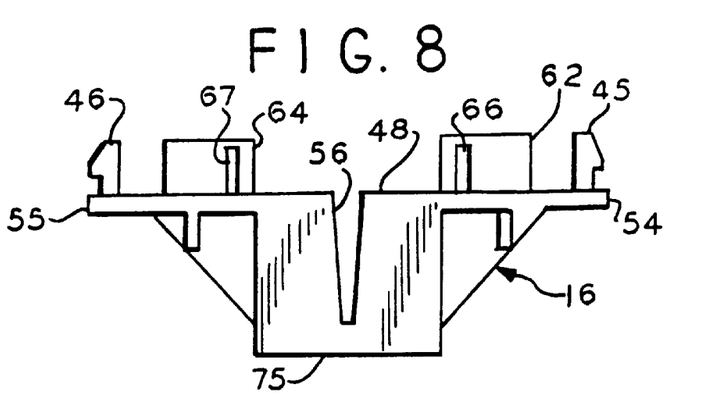
Figure 9:
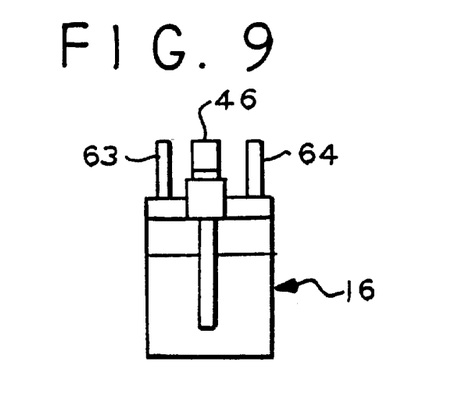
Figure 10:
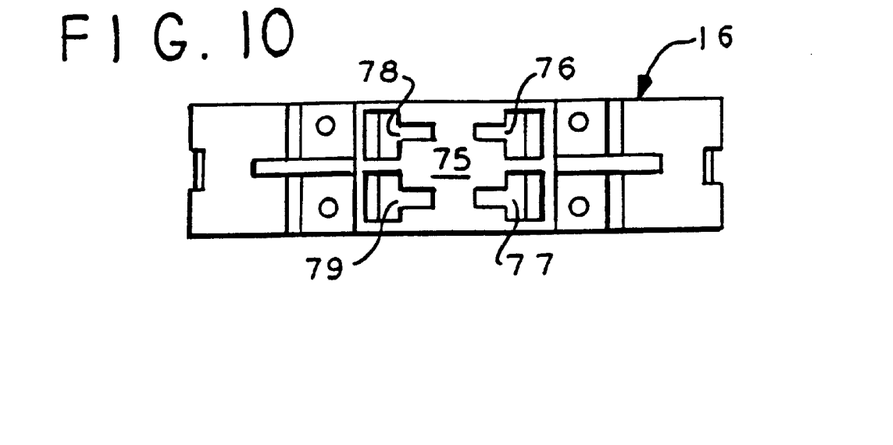

The structure of the cover 14 is illustrated in detail in FIGS. 3–6; cover 14 may be suitably injection molded from a suitable resilient material such as, for example, polycarbonate. Cover 14 includes a top 31, sides 32 and 33, ends 34 and 35 and an open bottom 36 (FIG. 6) providing the cover 14 with a hollow interior for receiving the telephone circuit 18 and printed circuit board 20 shown in FIG. 2. The lower portions of the cover ends 34 and 35 are provided, respectively, with opposed, parallel and integrally formed, resilient bars 38 and 39, note particularly FIG. 3, which resilient bars in cooperation with the respective ends 34 and 35 provide detent holes or apertures 41 and 42 for respectively receiving the upper portion of flexible detent members 45 and 46 provided on the opposed ends of the base 16 as shown in FIG. 8. Generally, and as described in detail below, the resilient bars 38 and 39, openings 41 and 42, and flexible base detent members 45 and 46 fasten the cover 14 and base 16 together.

Figure 11:
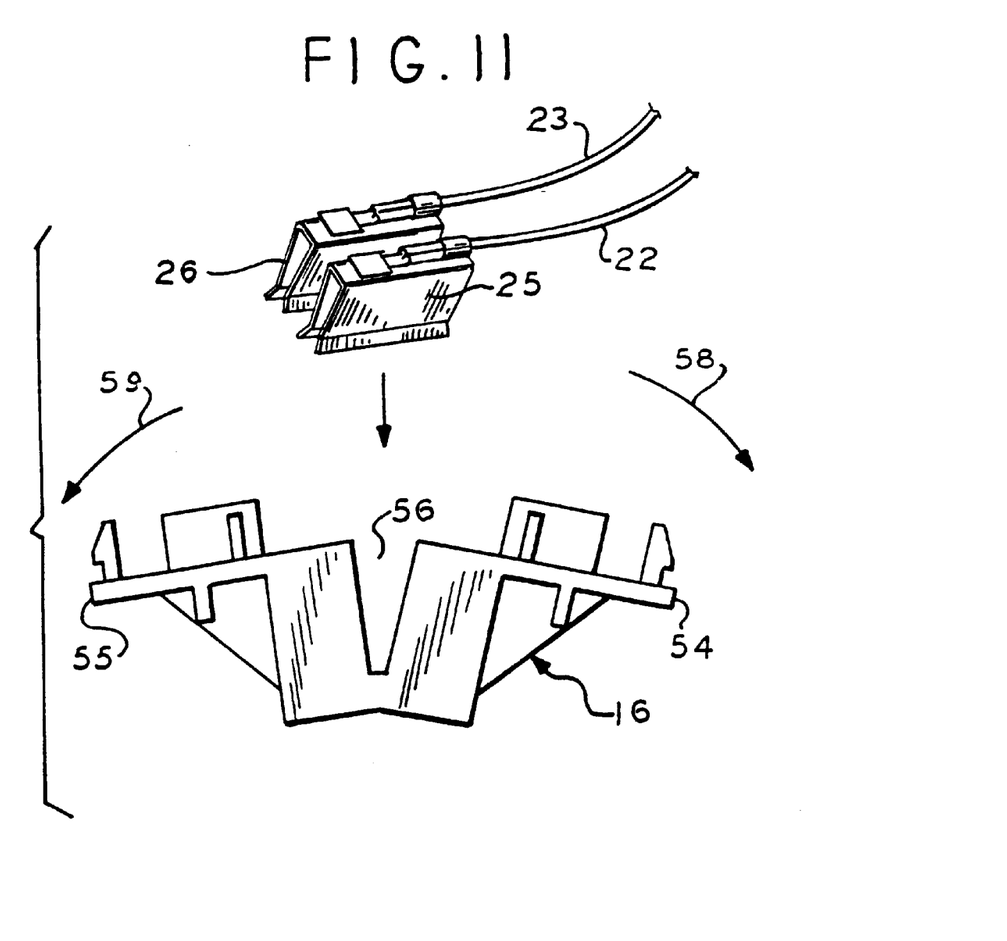
FIG. 11 is a diagrammatical view, partially in perspective, illustrating the deformability of the base of the present invention to facilitate mounting of the bridging clips in the base cavities.
Figure 12:
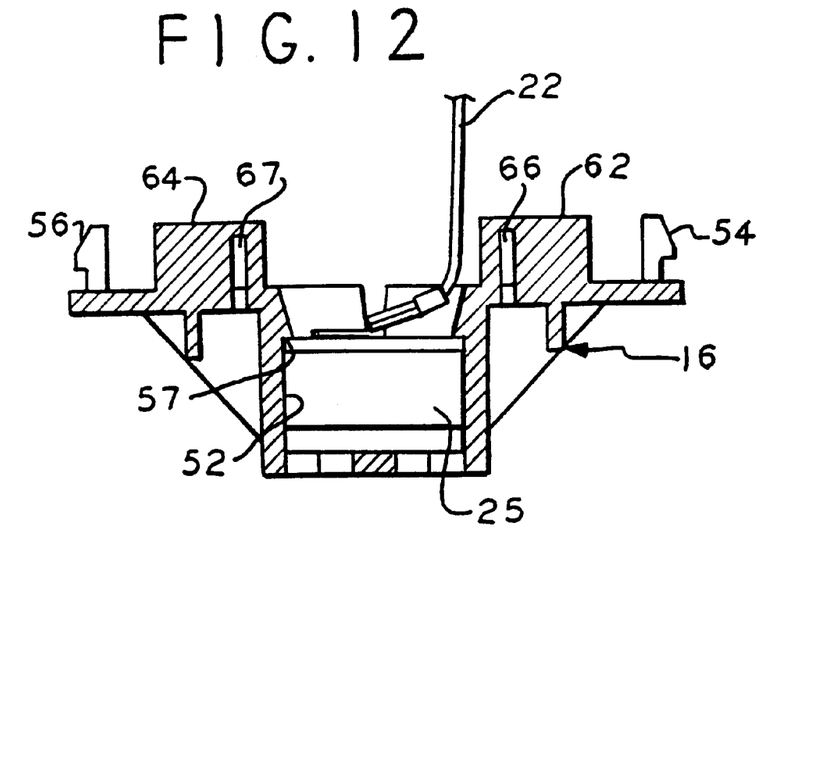
FIG. 12 is a cross-sectional view taken generally along the line 12—12 in FIG. 7 in the direction of the arrows.

The detailed structure of the base 16 is shown in FIGS. 7–12. Base 16 includes a central portion 48 including a pair of opposed end walls 48a and 48b, opposed outer side walls 48c and 48d, and internal intermediate wall 48e spaced from the side walls and which walls provide a pair of inwardly extending bridging clip receiving cavities 51 and 52 for receiving the bridging clips 25 and 26 (FIG. 11). The cavities 51 and 52 and the bridging clips 25 and 26 respectively are dimensioned to cause the bridging clips to be received within the cavities for mounting therein. As will be understood from FIGS. 7 and 12, the base 16 is provided with a pair of integrally formed, opposed, spaced apart and inwardly extending bridging clip mounting ridges, or bridging clip snap members 53 and 57, which snap over the top of the bridging clips 25 and 26 and mount them in the cavities 51 and 52 upon the base 16 being deformed and returning to its original shape as described below. As may be best noted in FIG. 8, the base central portion 48 is provided with an inwardly extending V opening 56 which extends across the central portion 48 and across the side walls 48c and 48d and intermediate wall 48e and across the cavities 51 and 52. It will be understood that the base 16 may be suitably injection molded from a suitable resilient material, such as for example polycarbonate. It will be understood that in accordance with the teachings of the present invention the inwardly extending V opening 56 and the resilient material of which the base 16 is made permit the base 16, in particular the central portion 48, to be deformed, it as shown in FIG. 11, upon suitable deforming forces, indicated by the arrows 58 and 59 in FIG. 11, being applied to the ends 54 and 55 of the base 16. Such deformation increases the access of the bridging clips 25 and 26 to the bridging clip receiving cavities 51 and 52 and facilitates the insertion and mounting of the bridging clips in the cavities. Upon the deforming forces 58 and 59 being removed, the resilient base 16, particularly the resilient central portion 48, returns to its original or undeformed shape shown in FIG. 8 with the bridging clip snap members 53 and 57 snapped over the bridging clips 25 and 26 as shown in FIG. 12 with regard to bridging clip 25 and bridging clip snap member 57 whereby the bridging clips 25 and 26 are retained and mounted in the bridging clip receiving cavities 51 and 52. It will be understood that instead of being V-shaped, the inwardly extending opening 56 best seen from FIG. 8 could be of other shapes, for example, U-shaped.

Figure 7:
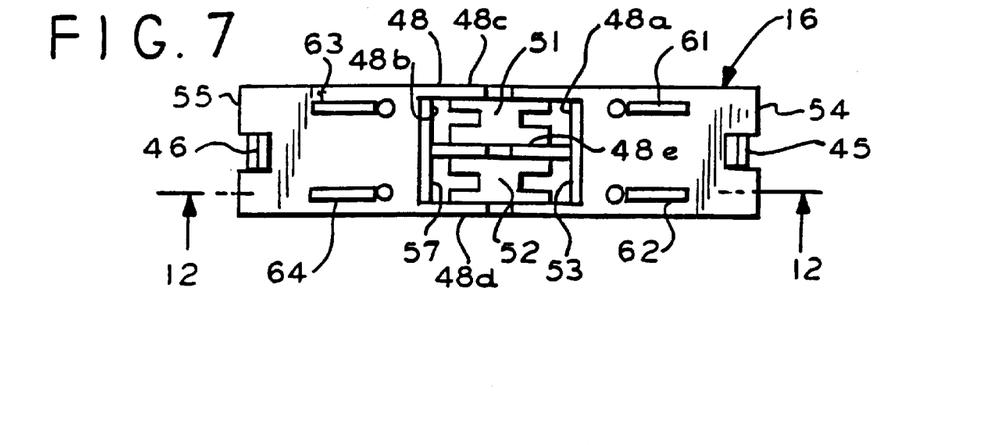
FIGS. 7–10 are, respectively, top, front, side and bottom views of the base of the present invention.

As will be understood by reference to FIGS. 7 and 8, the base 16 is provided with four upwardly extending and integrally formed ribs 61–64. The ribs, as illustrated by representative ribs 62 and 64 shown in FIG. 8, are provided respectively with encapsulant receiving openings or holes 66 and 67. As described in detail below, the rib holes or openings 66 and 67 receive a portion of the encapsulating material which encapsulates the telephone circuit 18 and printed circuit board 20, FIG. 2, thereby further fastening the covers 14 and base 16 together.

Figure 13:
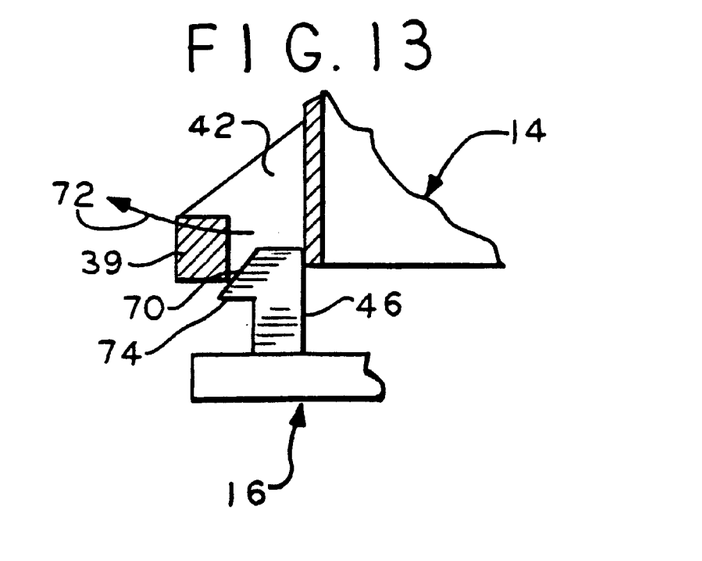
FIG. 13 is a partial view, also partially in cross-section, illustrating fastening together of the cover and base of the present invention.

Referring now in detail to the manner in which the resilient base detent members 45 and 46, FIG. 8, and the cover bars 38 and 39 and openings 41 and 42 fasten the cover 14 and base 16 together, reference is made to FIG. 13 wherein representative flexible detent member 46, bar 39 and opening 42 are shown. The upper portion of representative resilient detent member 46 is hook-shaped and includes an inclined surface 70 which, upon the cover 14 and base 16 being pushed together, engages the flexible bar 39 and functions as a camming surface to bend or flex the flexible bar 39 outwardly as indicated by the arrow 72 in FIG. 13, to permit the upper portion of the resilient detent member 46 to be moved upwardly into and through the hole or opening 42 after which the resilient bar and detent member 46 spring or return to their original shapes with the lower portion 74 of the resilient detent member 46 being hooked over the top of the bar 39. Similarly, the base resilient detent member 45 (FIG. 8) is hooked over the cover bar 38 of FIG. 3.

Figure 14:
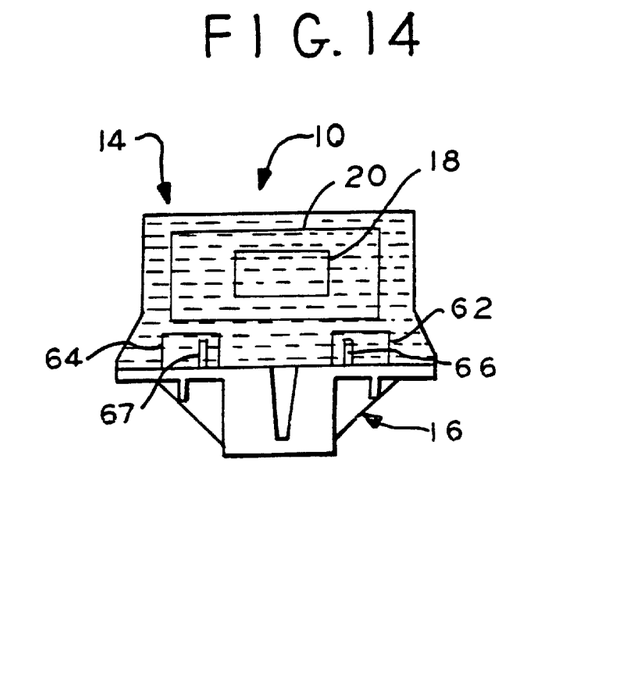
FIG. 14 is a diagrammatical illustration illustrating the encapsulating of the telephone circuit of the present invention and the manner in which a portion of the encapsulant further fastens the cover and base together.

Referring to FIG. 14, it will be understood that prior to the fastening together of the cover 14 and base 16, the cover 14 is inverted from the positions shown in FIGS. 3–6, a suitable encapsulating material, such as a suitable curable urethane potting material indicated by the parallel dashed lines in FIG. 14, is placed into the cover 14 to encapsulate the telephone circuit 18 and circuit board 20; the encapsulating material encapsulates the telephone circuit 18 and the circuit board 20 and provides protection thereto, such as moisture protection, and also serves to mount the telephone circuit and circuit board in the cover 14. It will be understood that sufficient encapsulating material is placed into the cover 14 such that upon the cover 14 and base 16 being fastened together as described above, a portion of the encapsulating material enters the rib holes or openings, such as representative holes or openings 66 and 67 formed respectively in upwardly extending ribs 62 and 64 shown in FIG. 14, and upon the encapsulating material being cured and hardening, a portion of the hardened encapsulating material resides in the holes as indicated diagrammatically in FIG. 14 to further fasten the cover 14 and base 16 together.

Figure 15:
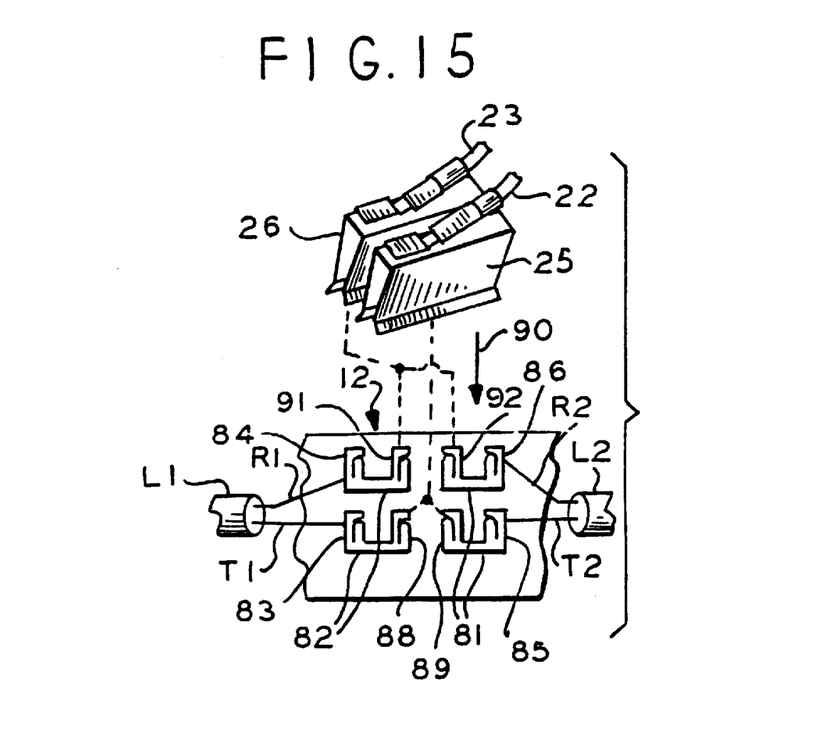
FIG. 15 is a diagrammatical illustration illustrating the mounting of the apparatus or connector of the present invention to the terminals of a connector block.

Referring to FIG. 15, the manner in which the bridging clips 25 and 26 mount the apparatus or connector 10 of the present invention to a connecting block, such as connecting block 12, is illustrated in. The connector block 12, as is known to the art, includes pluralities of associated pairs of terminals for interconnecting incoming telephone lines with telephone subscriber lines. Representative pairs of connector block terminals 81 and 82 are shown in FIG. 15; each terminal, as known to the art, is a dual terminal including two integrally formed individual terminals as shown in FIG. 15. The tip and ring lines T1 and R1 of representative incoming telephone line L1 are connected respectively to the individual terminals 83 and 84 of terminal pair 82 and the tip and ring lines T2 and R2 of the representative telephone subscriber line L2 are connected respectively to individual terminals 85 and 86 of terminal pair 81. Referring again to FIG. 10, it will be understood that the base 16, particularly the bottom 75 of the base 16, is provided with a plurality of apertures or openings 76–79 providing access to the bridging clips 25 and 26. Upon the apparatus or connector 10, FIG. 1, being forced downwardly as indicated by the arrow 90 in FIG. 15, the bridging clips 25 and 26 are forced respectively into engagement respectively with the individual terminals 88 and 89 and 91 and 92 as indicated by the dashed lines extending downwardly from the bridging clips 25 and 26 in FIG. 15, to cause the bridging clips 25 and 26 to be spread apart and to be forced into mechanical and electrical engagement with the individual terminals 88 and 89 and 91 and 92; more particularly, the individual terminals 88 and 89 are inserted through the base bottom openings 79 and 77 (FIG. 10) for mechanical engagement with the bridging clip 25 to electrically interconnect the tip T1 of the incoming telephone line L1 with the tip T2 of the subscriber line L2 and the individual terminals 91 and 92 are inserted through the base bottom openings 78 and 76 (FIG. 10) for mechanical engagement with the bridging clip 26 to electrically interconnect the ring line R1 of the incoming telephone line L1 with the ring line R2 of the telephone subscriber line L2. Thus, the bridging clips both electrically interconnect the tip and ring lines of the incoming telephone line L1 with the tip and ring lines of the telephone subscriber line L2 and mechanically, but removably, mount the apparatus or connector 10 of the present invention, FIG. 1, to the individual terminals 88 and 89 and 91 and 92 and thereby to the connector block 12. Since, as noted above, with regard to the description of FIG. 2, the telephone circuit 18 is connected to the bridging clips 25 and 26, it telephone circuit 18 is connected in parallel to the incoming telephone line L1 and the telephone subscriber line L2, FIG. 15.

Referring now to FIGS. 16–24, an alternative embodiment of apparatus or connector embodying the present invention is shown and indicated by general numerical designation 110. It will be understood that apparatus or connector 110 includes elements or components that are the same as the elements or components of apparatus or connector 10 described above and shown variously in FIGS. 1–15 and, for convenience of reference and understanding, such elements or components are given the same numerical designations in FIGS. 16–24 and will be understood to perform the same functions as described above. In particular, it will be understood that the base 16 of the apparatus or connector 110 is the same as the base 16 of apparatus or connector 10 described above and shown in FIGS. 2, 7–12 and 14. It will be generally understood that alternate embodiment apparatus or connector 110, except for the difference described in detail below, performs the same function as apparatus or connector 10 described above and is for being mounted to a connector block, such as connector block 12 shown in FIG. 1, to mechanically and electrically engage first and second pairs of terminals provided on the connector block to mount the apparatus or connector 110 on such first and second pairs of terminals and to electrically interconnect an incoming telephone line with a telephone subscriber line and to interconnect a telephone circuit, such as a half-ringer, to such lines.

While the apparatus or connector 10 of the present invention has performed well, it has been found that in order to test the internally mounted telephone circuit 18 (FIG. 2), the apparatus or connector 10 must be physically dismounted and electrically disconnected from the connector block 12 (FIG. 1) in order to test the internally mounted telephone circuit 18. Further, it has been found that it is advantageous to test the internally mounted telephone circuit 18 while the telephone circuit is electrically connected to the connector block 12, i.e., while the incoming telephone company line L1 (FIG. 15) is connected to the telephone subscriber line L2 (FIG. 15) by the connector. To test the internally mounted telephone circuit 18 of the apparatus or connector 10 while the apparatus or connector 10 is mounted to the connector block 12, and while the incoming telephone line and telephone subscriber line are being interconnected by the connector 10, requires the unwanted time consuming action of placing auxiliary lead connections on the connector block terminals and special test configurations. It will be understood, and as described in detail below, that the apparatus or connector 110 of the present invention provides for the testing of the internally mounted telephone circuit while the connector 110 is connected to a connector block such as connector block 12 of FIG. 1 and while the incoming telephone line is connected to the telephone subscriber line by the connector 110. Accordingly, it will be generally understood, and referring to FIG. 16, that the apparatus or connector 110 is provided with a pair of test terminal assemblies indicated by general numerical designations 112 and 114 which provide externally testable terminals for testing a telephone circuit mounted internally in the connector 110 while the connector 110 is mounted on a connector block, such as connector block 12 shown in FIG. 1, and while the connector 110 is interconnecting the incoming telephone line with the telephone subscriber line. It will be further generally understood, and referring further to FIG. 16, that the test terminal assemblies 112 and 114 are provided, respectively, with test terminals indicated by numerical designations 116 and 118, shown more particularly in FIG. 22 and described in detail below, and which test terminals are protected by receptacles, shown particularly in FIG. 23 and described in detail below, which receptacles prevent the accidental contact of the test terminals 116 and 118 with equipment or personnel.

Figure 16:
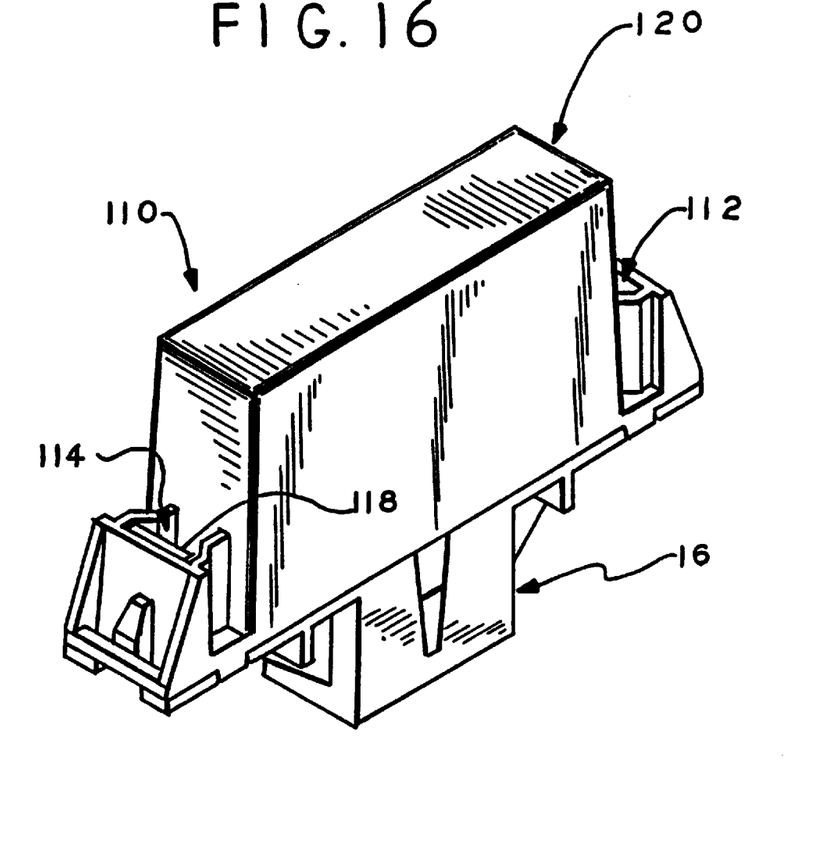
FIG. 16 is a perspective view of an alternate embodiment of apparatus or connector of the present invention.

The apparatus or connector 110 of FIG. 16 includes a cover indicated by general numerical designation 120 with the structure of the cover 120 being shown in detail in FIGS. 17–21; cover 120 may be suitably injection molded from a suitable resilient material such as, for example, polycarbonate.

Figure 22:
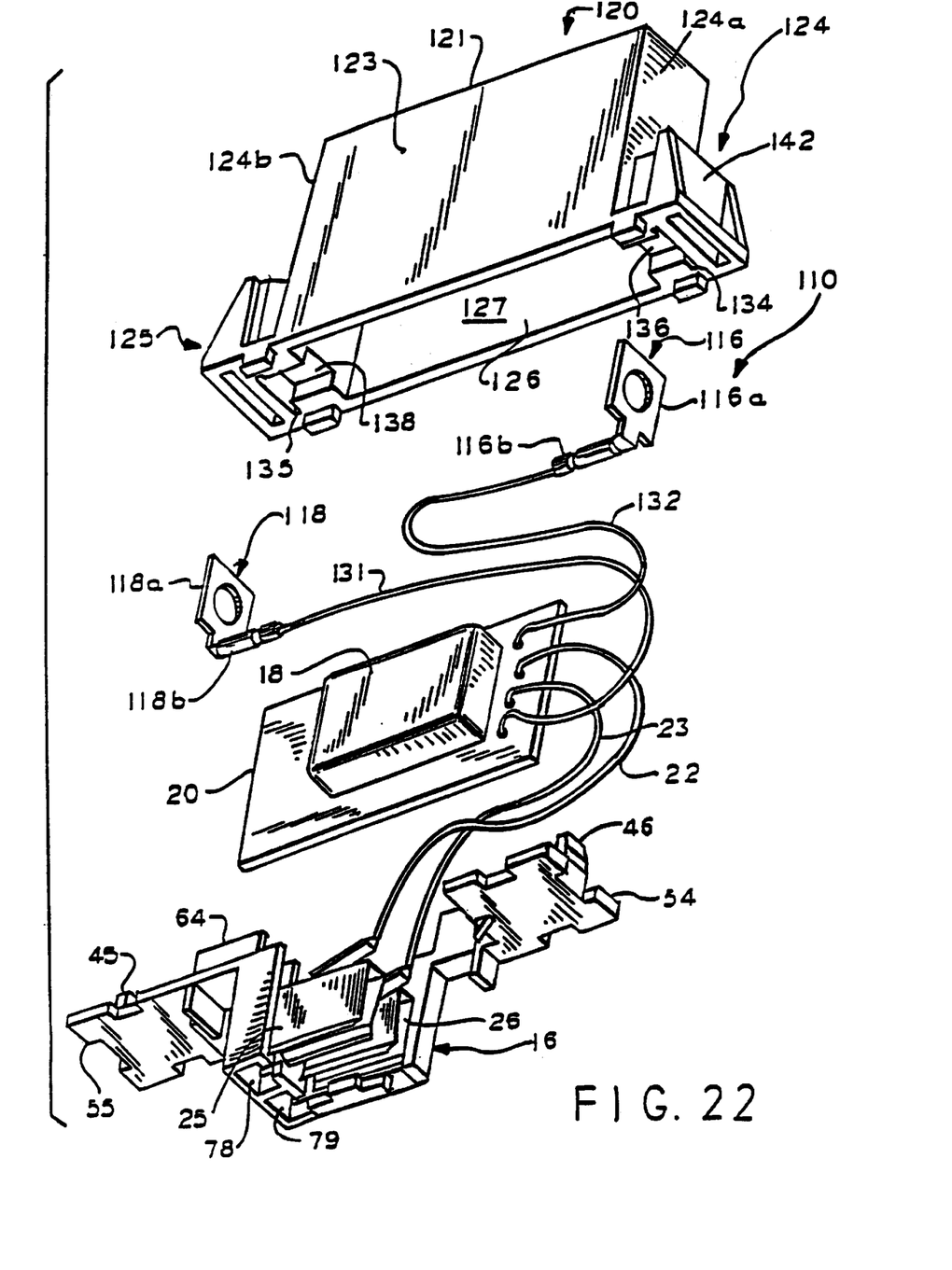
FIG. 22 is an exploded view of the alternate embodiment apparatus or connector of the present invention.

Referring to FIGS. 17–21, cover 120 includes a top 121, sides 122 and 123, opposed end portions indicated by general numerical designations 124 and 125 and including opposed end walls 124a and 125a, and an open bottom 126 (FIG. 20) providing the cover 120 with a hollow interior 127 for receiving the telephone circuit 18 and printed circuit board 20 shown in FIG. 22.

Figure 17:
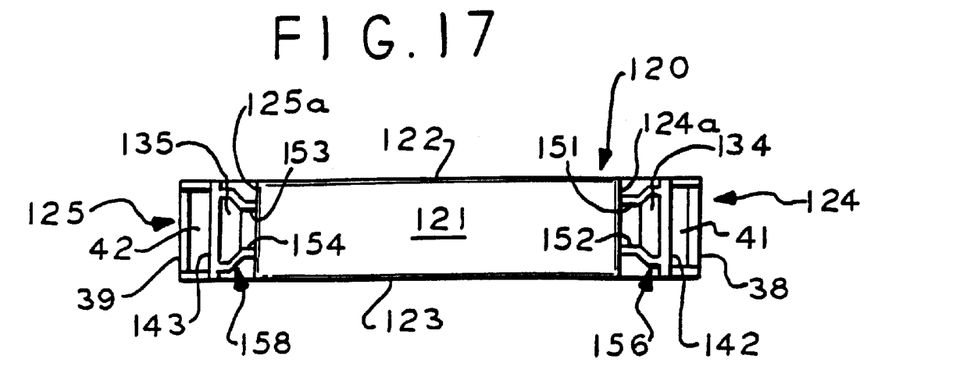
FIGS. 17–21 are, respectively, top, side, end, bottom and perspective views of the cover of the alternate embodiment cover of the present invention.
Figure 18:
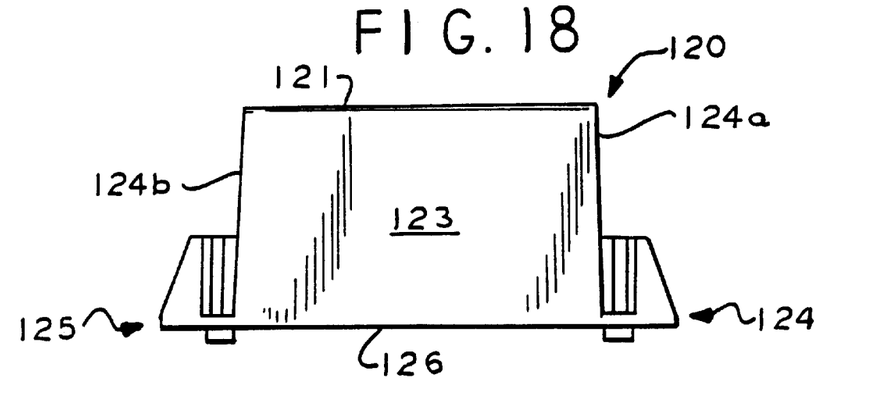
Figure 19:
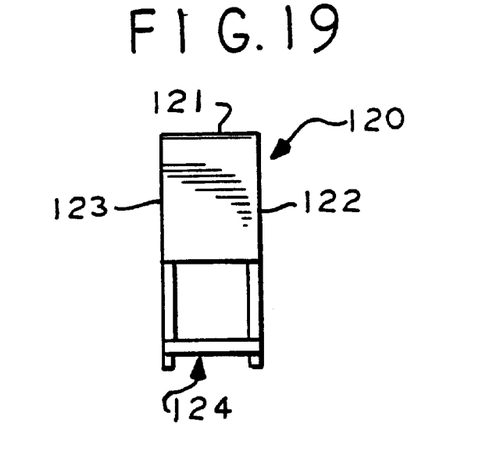
Figure 20:
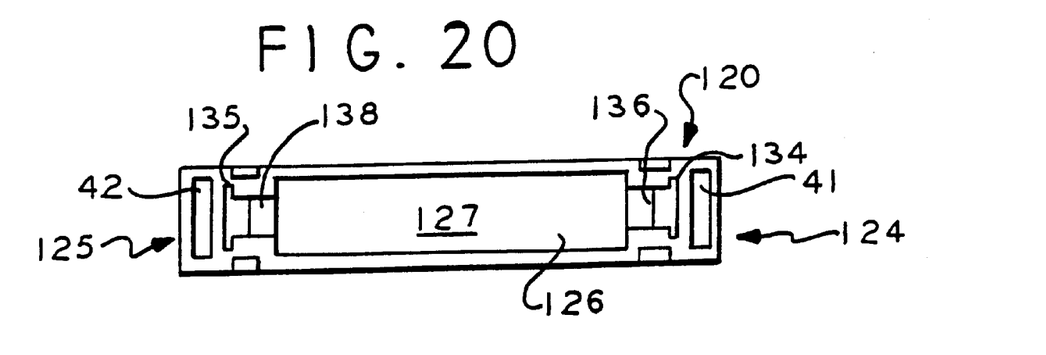
Figure 21:
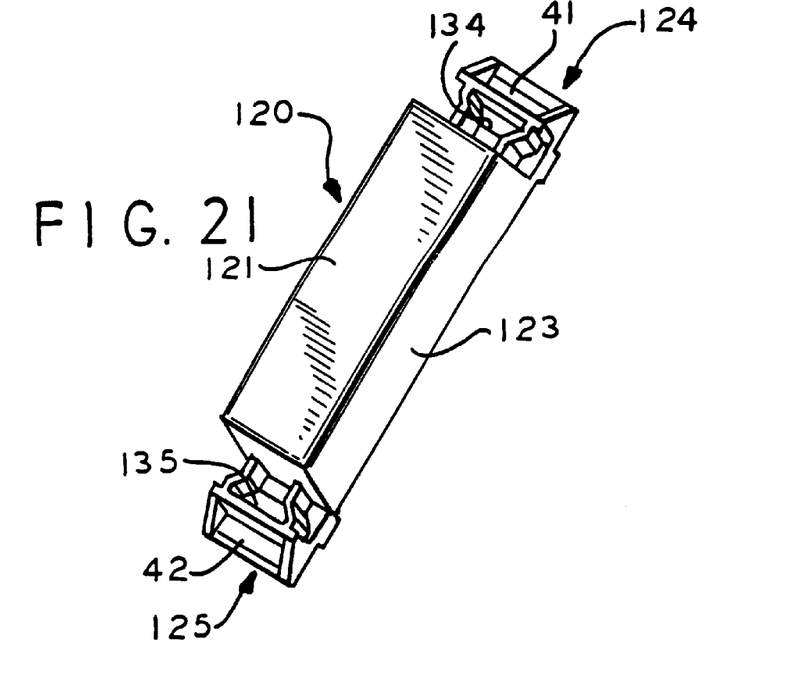
Figure 23:
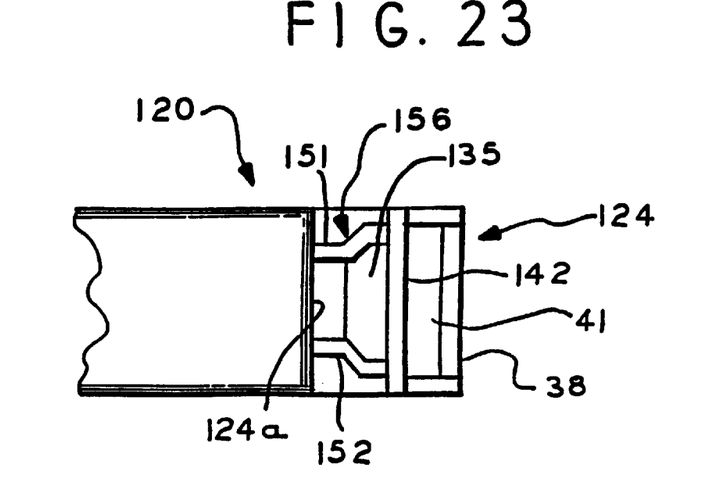
FIG. 23 is an enlarged partial view of the righthand portion of FIG. 17.
Figure 24:
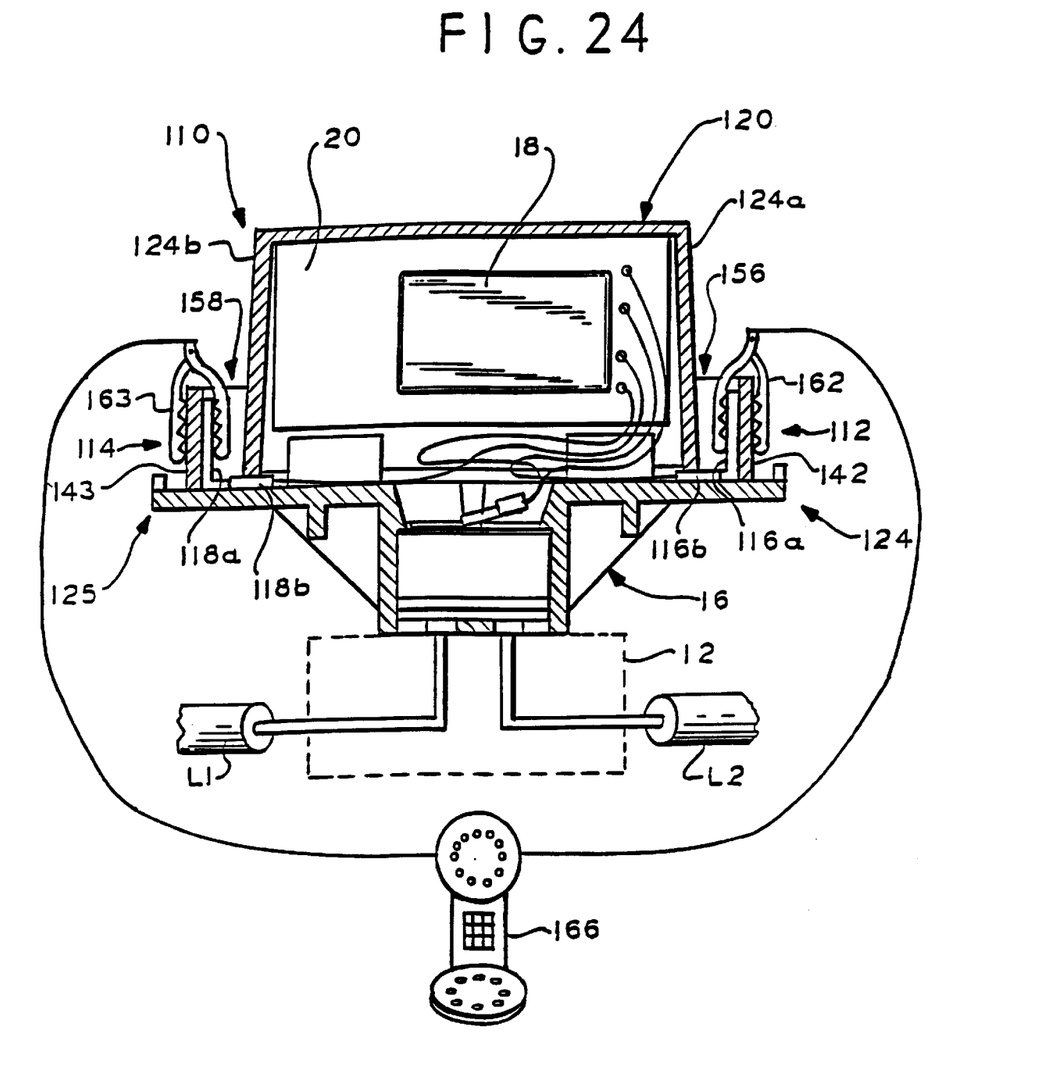
FIG. 24 is a vertical cross-sectional view of the alternate embodiment apparatus or connector of the present invention and also shows the external testing connections for external testing of an internally mounted telephone circuit and an incoming telephone company line and a telephone subscriber line.

Referring to FIG. 22, apparatus or connector 110 in addition to including the base 16, as noted generally above, also includes the spring or bridging clips 25 and 26, leads 22 and 23, telephone circuit 18 mounted on printed circuit board 20. The test terminals 116 and 118, noted above as being included in the test terminal assemblies 112 and 114 (FIG. 16) are connected to the printed circuit board 20 by leads 131 and 132. It will be understood that the leads 131 and 132 are connected respectively to leads 23 and 22 and to the telephone circuit 18 by suitable conductive traces (not shown) provided on the printed circuit board 20. Test terminals 116 and 118 are generally L-shaped and include, respectively, as viewed in FIG. 22, upwardly extending portions 116a and 118a and transverse portions 116b and 118b. Referring again to cover 120 and to FIGS. 17, 20, 21 and 22, the opposed end portions 124 and 125 of the cover are provided, respectively, with slots 134 and 135 for receiving, respectively, the upwardly extending portions 116a and 118a of the respective test terminals 116 and 118. The bottoms of the cover opposed end portions 124, are 125, note FIGS. 20 and 22, are provided respectively with inwardly extending channels 136 and 138 which channels communicate the hollow interior 127 of the cover 120 with the respective slots 134 and 135. The channels 136 and 138 receive, respectively, the transverse portions 116b and 118b (FIG. 22) of the test terminals 116 and 118. Further, as shown variously in FIGS. 17, 21, 22, 23 and 24, the opposed cover end portions 124 and 125 are provided, respectively, with flat support walls 142 and 143 against which the upwardly extending portions 116a and 118a of the test terminals 116 and 118 reside upon being inserted into the respective slots 134 and 135; this is best seen in FIG. 24. Additionally, the respective cover end portions 124 and 125, FIGS. 17 and 23, are provided, respectively, with opposed pairs of walls 151 and 152 and 153 and 154. Opposed pair of walls 151 and 152, and cover end wall 124a, and support wall 142, cooperatively provide a receptacle indicated by general numerical designation 156 (FIGS. 17, 23 and 24), and opposed pair of walls 153 and 154, cover end wall 125a, and flat support wall 143, cooperatively provide a receptacle indicated by general numerical designation 158 in FIG. 17; receptacle 156 is better seen in the enlarged view shown in FIG. 23.

Referring to FIG. 24, the apparatus or connector 120 is shown in transverse cross-section and shown, diagrammatically, mounted mechanically and thereby electrically to the terminals of the connector block 12 and connected electrically to the incoming telephone line L1 and a telephone subscriber line L2. As will be understood from FIG. 24, the receptacles 156 and 158 form open enclosures in which the respective upwardly extending test terminal portions 116a and 118a reside and which receptacles prevent unwanted or accidental contact with equipment or personnel. It will be further understood from FIG. 24 that the receptacles 156 and 158 are for receiving test probes, such as well known alligator clips 162 and 163, for connecting the test terminals 116 and 118 to test apparatus, such as for example, the well-known butt test set 166. From FIGS. 15, 22 and 24, it will be understood that the test terminal 116 is connected by lead 132, printed circuit board 20 to the telephone circuit 18, and further by the lead 22, bridging clip 25, connector block terminals 83, 88, 81 and 85 (FIG. 15) to the tip line T1 of the incoming telephone line L1 and the tip line T2 of the telephone subscriber line L2; similarly, the test terminal 118 is connected by the lead 132, printed circuit board 20 to the telephone circuit 18, and further by the lead 23, bridging clip 26, connector block terminals 84, 91, 92 and 86 (FIG. 15) to the ring line R1 of the incoming telephone line L1 and the ring line R2 of the telephone subscriber line L2. Such connections of the test terminals 116 and 118 provide external connection to the internally mounted telephone circuit 18, to the incoming telephone line L1 and to the telephone subscriber line L2. Such external connections permit the internally mounted telephone circuit 18, the incoming telephone line L1 and the telephone subscriber line L2 to be tested while the apparatus or connector 120 is mounted mechanically and electrically to the connector block 12 and does not require dismounting of the connector 124 for such testing.

It will be understood by those skilled in the art that many modifications and variations may be made in the present invention without departing from the spirit and the scope thereof.

What is claimed is:

1. An apparatus for connection to the terminals of a connector block for connecting an incoming telephone line to a subscriber line, comprising:
   a base having two opposed side walls that define at least one cavity;
   wherein said base is constructed of a resilient material, and wherein each said opposed side wall has a slit therein that extends from the top of said side wall downwardly toward, but not extending to, the bottom of said side wall;
   wherein said slit in each said side wall allows said base to be deformed, thereby increasing access to said cavity; and
   at least one connector positioned in said cavity for connecting the terminals of the connector block to connect an incoming telephone line to a subscriber line.

2. The apparatus of claim 1 wherein said base further comprises members for fitting over the top of said connector in said cavity after said base is deformed, said connector is inserted in said cavity, and said base is returned to its original shape.

3. The apparatus of claim 1 wherein said base is deformed by applying a force to said base such that said slits in said side walls are widened.

4. The apparatus of claim 1 wherein said base further comprises a generally flat top surface extending outwardly in opposite directions from said cavity, and said base can be deformed by applying a force to the opposite ends of said top surface.

5. The apparatus of claim 4 wherein said connector is connected to a telephone circuit housed within a cover that is connected to the top surface of said base.

6. The apparatus of claim 5 wherein said telephone circuit is a halfringer.

7. The apparatus of claim 5 wherein said base further comprises at least one rib extending upwardly from said top surface of said base, said rib having an opening for receiving encapsulating material which encapsulates the telephone circuit within said cover when said cover is connected to said base.

8. The apparatus of claim 1 wherein said slit is generally V-shaped.

9. The apparatus of claim 1 wherein said slit is generally U-shaped.

10. The apparatus of claim 1 wherein said base is made of polycarbonate.

11. The apparatus of claim 1 further comprising:
   a telephone circuit housed within a cover that is connected to said base;
   at least one test terminal electrically connected to said telephone circuit;
   at least one receptacle on said cover for receiving said test terminal;
   wherein said receptacle provides sufficient room for a test probe to be inserted therein such that the test probe is electrically connected to said test terminal in said receptacle to allow external connection to said telephone circuit without disassembling any portion of said apparatus.

12. The apparatus of claim 11 wherein said receptacle on said cover includes a slot bounded by an outer support wall, wherein said test terminal is provided in said slot, and wherein said outer support wall guards against unwanted electrical contact of said test terminal in said slot.

13. The apparatus of claim 12 wherein said test terminal includes an upwardly extending portion and a transverse portion, and wherein said upwardly extending portion is located within said slot of said receptacle.

* * * * *